US008600106B1

(12) United States Patent
Parenteau et al.

(10) Patent No.: US 8,600,106 B1
(45) Date of Patent: Dec. 3, 2013

(54) METHOD AND APPARATUS FOR TRACKING OBJECTS WITHIN A VIDEO FRAME SEQUENCE

(75) Inventors: Alexandre Parenteau, San Jose, CA (US); Abhinav Darbari, Noida (IN); Timothy H. Roth, Seattle, WA (US); Manish S. Kulkarni, Saratoga, CA (US); Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 356 days.

(21) Appl. No.: 12/807,236

(22) Filed: Aug. 31, 2010

(51) Int. Cl.
*G06K 9/00* (2006.01)

(52) U.S. Cl.
USPC ........................................................ 382/103

(58) Field of Classification Search
USPC ....................... 382/103; 348/169, 172; 342/90
See application file for complete search history.

(56) References Cited

U.S. PATENT DOCUMENTS

| | | | | |
|---|---|---|---|---|
| 5,606,655 | A * | 2/1997 | Arman et al. | 345/440 |
| 5,684,715 | A * | 11/1997 | Palmer | 348/473 |
| 5,923,365 | A * | 7/1999 | Tamir et al. | 348/169 |
| 6,295,367 | B1 * | 9/2001 | Crabtree et al. | 382/103 |
| 6,337,916 | B1 * | 1/2002 | Boyd et al. | 382/103 |
| 6,424,744 | B2 * | 7/2002 | Miyatake et al. | 382/190 |
| 6,643,387 | B1 * | 11/2003 | Sethuraman et al. | 382/107 |
| 6,724,915 | B1 * | 4/2004 | Toklu et al. | 382/103 |
| 7,739,598 | B2 * | 6/2010 | Porter et al. | 715/723 |
| 8,135,220 | B2 * | 3/2012 | Kim et al. | 382/224 |
| 2004/0017930 | A1 * | 1/2004 | Kim et al. | 382/103 |
| 2007/0064974 | A1 * | 3/2007 | Ayachitula et al. | 382/103 |
| 2008/0219496 | A1 * | 9/2008 | Tewfik et al. | 382/100 |
| 2009/0087023 | A1 * | 4/2009 | Porikli et al. | 382/103 |
| 2009/0324086 | A1 * | 12/2009 | Tojo et al. | 382/190 |
| 2010/0128118 | A1 * | 5/2010 | Swindells et al. | 348/78 |
| 2010/0142914 | A1 * | 6/2010 | Zhao | 386/52 |

OTHER PUBLICATIONS

Irani et al ("Detecting and Tracking Multiple Moving Objects Using Temporal Integration", Dept. of Computer Science The Hebrew University of Jerusalem 91904 Jerusalem, Israel, 1992).*
Jean-Yves Bouguet, "Pyramidal Implementation of the Lucas Kanade Feature Tracker Description of the Algorithm" Intel Corporation, Microprocessor Research Labs, pp. 1-9, 2001.
Hailin Jin, Paolo Favaro, Stefano Soatto, "Real-Time Feature Tracking and Outlier Rejection with Changes in Illumination", 6 pages, 2001.
Jianbo Shi, Carlo Tomasi, "Good Features to Track", IEEE 1063-6919/94, dated 1994, pp. 593-600.
Bruce D. Lucas; Takeo Kanade, "An Iterative Image Registration Technique with an Application to Stereo Vision", Computer Science Department, Carnegie-Mellon University, Pittsburgh, PA 15213, From Proceedings of Imaging Understanding Workshop, pp. 121-130, 1981.
Simon Baker, Iain Matthews, Lucas-Kanade 20 Years on: A Unifying Framework, The Robotics Institute, Carnegie Mellon University, 5000 Forbes Avenue, Pittsburgh, PA 15213, USA, International Journal of Computer Vision 56(3), pp. 221-225, 2004.

* cited by examiner

*Primary Examiner* — Shervin Nakhjavan
(74) *Attorney, Agent, or Firm* — Moser Taboada (57) ABSTRACT

A method and apparatus for tracking objects within a video frame sequence. In one embodiment, a method for tracking an object within a video frame sequence is disclosed. The method includes processing each $j^{th}$ frame of the video frame sequence to determine a motion vector defining motion between a prior $j^{th}$ frame and a current $j^{th}$ frame. The method includes creating an object descriptor for an object being tracked followed by generating a document object model comprising motion information and the object descriptor.

20 Claims, 7 Drawing Sheets

METHOD AND APPARATUS FOR TRACKING OBJECTS WITHIN A VIDEO FRAME SEQUENCE

BACKGROUND

1. Field

Embodiments generally relate to a method and apparatus for tracking objects, and more specifically, to a method and apparatus for tracking objects within a video frame sequence.

2. Description of the Related Art

The advent of low cost, high quality, portable video cameras has resulted in video camera users storing an abundance of digital video on computers. A streaming video clip comprises a sequence of video frames that are not easily annotated to identify objects, especially, people, within the clip or frame. Entire clips may be titled and dated; thus, enabling keyword searching for particular clips. However, objects, places, people and such within the clips are generally not searchable unless a user takes the time to annotate each frame within each clip.

Object identification techniques have been developed to identify objects in video frame sequences using attributes of the objects to identify and trace an object from frame-to-frame within the video frame sequence. The object track can be used as a reference for tracking similar objects in the video frame sequence.

However, when using such prior techniques, the object must be accurately identified in a particular frame and remain identifiable through the entire video frame sequence to be able to be accurately tracked. Substantial computer resources are required to perform accurate object identification. Subsequent tracking of an object is provided by repeated object identification processing on each subsequent frame in the sequence. Any occlusion or substantial change in the object, e.g., a person faces away from the camera, will cause a loss of tracking. The complexity of the processing required does not enable a typical consumer to utilize such object tracking techniques using a personal computer.

Accordingly, there exists a need for an improved method and apparatus for tracking objects within a video frame sequence.

SUMMARY

Embodiments including a method and apparatus for identifying and tracking objects in a video frame sequence are disclosed. In one embodiment, a method of tracking an object within a video frame sequence comprises processing each $j^{th}$ frame of the video frame sequence to determine a motion vector defining motion and a current r frame. Once identified, the method between a prior $j^{th}$ frame creates an object descriptor for the object being tracked and generates a document object model comprising motion information related to the object and the object descriptor.

While the method and apparatus for identifying and tracking objects in a video frame sequence are described herein by way of example for several embodiments and illustrative drawings, those skilled in the art will recognize that the method and apparatus for identifying and tracking graphical objects in a video frame sequence are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for identifying and tracking objects within a video frame sequence as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for identifying and tracking objects in a video frame sequence are disclosed herein. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated or transformed. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
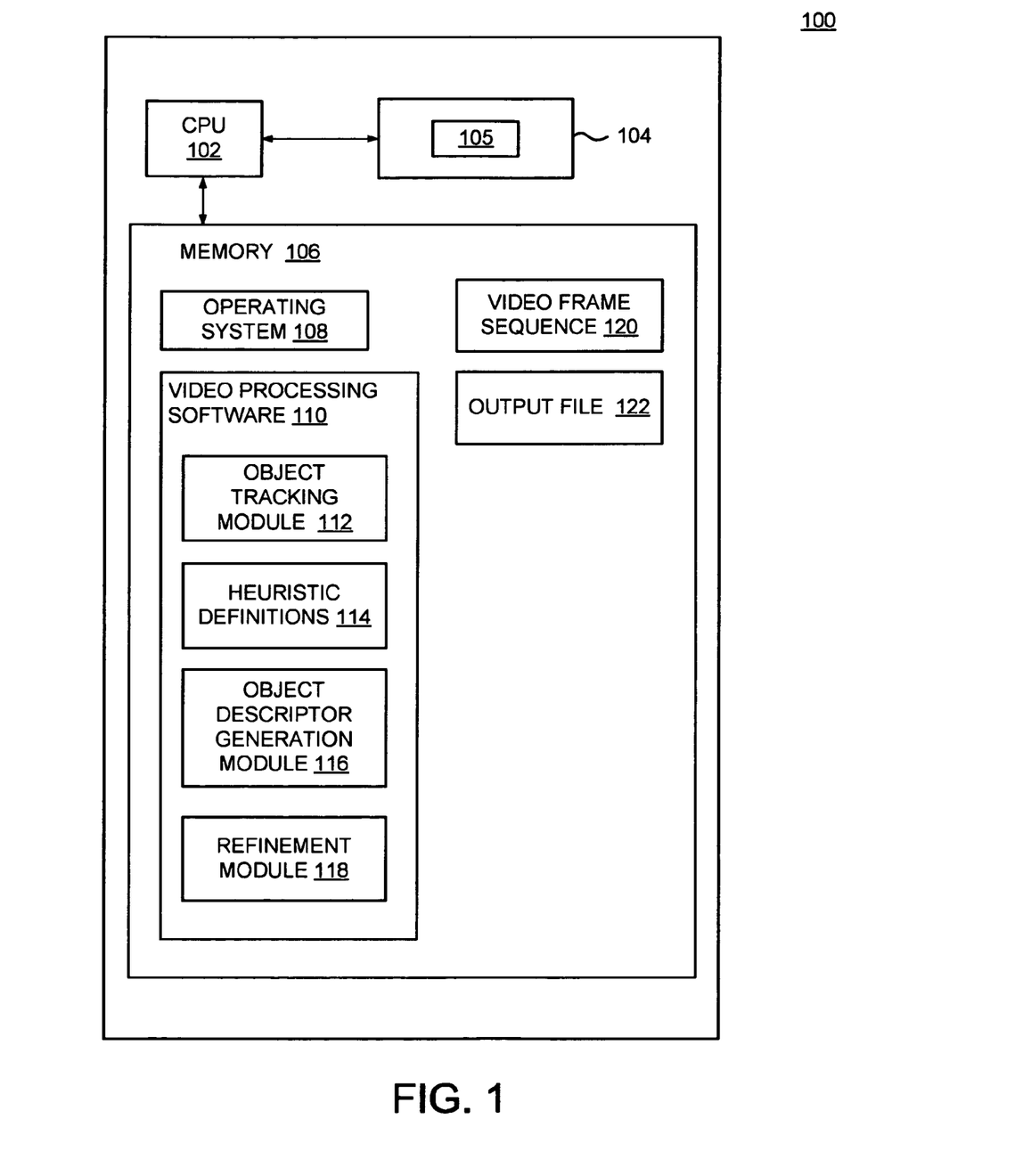
FIG. 1 is a simplified block diagram of a computer system for tracking an object within a video frame sequence according to one or more embodiments.

FIG. 1 is a simplified block diagram of a computer system 100 for identifying and tracking graphical objects in a video frame sequence, for example, in a video clip, according to at least one embodiment. One embodiment of a computer system used to implement the various embodiments of the invention is described in detail with respect to FIG. 7.

In different embodiments, the computer system 100 may be any of various types of devices, including, but not limited to, a personal computer system, desktop computer, laptop, notebook, notebook computer, personal digital assistant, pad computer, mainframe computer system, handheld computer, workstation, network computer, a camera, a set top box, a mobile device, smart phone, a consumer device, application server, or in general any type of computing or electronic device that is used to process video.

The computer system 100 includes a central processing unit 102, a plurality of support circuits 104 and a memory 106. The support circuits 104 include a display device 105 as well as other circuits to support the functionality of the CPU 102. Such circuits may include clock circuits, cache, power supplies, network cards, video circuits and the like.

The memory 106 may comprise read only memory, random access memory, removable memory, disk drives, optical drives and/or other forms of digital storage. The memory 106 is configured to store an operating system 108, video processing software 110, a video frame sequence 120 and an output file 122. The video processing software 110 includes an object tracking module 112, a heuristic definitions module 114, an object descriptor generation module 116 and a refinement module 118. The object tracking module 112, for example, tracks an object of interest in the video frame sequence 120. The heuristics definitions module 114, for example, is configured to refine both a tracked object of interest and its object descriptors. The object descriptor generation module 116 is configured to create an object descriptor that can be used to facilitate identifying an object of interest in other video frame sequences. The refinement module 118 is configured to refine the object descriptors and object tracks. The functions of the various modules may be implemented in hardware, software, firmware, or a combination thereof.

Figure 2:
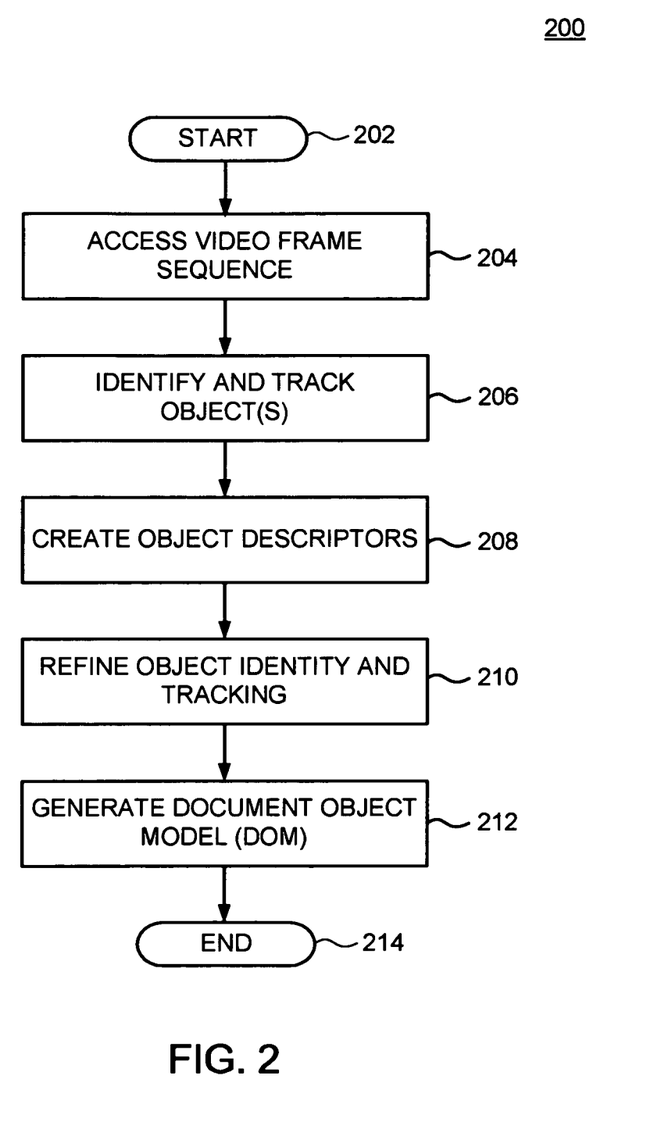
FIG. 2 is a flow diagram illustrating a method for identifying and tracking an object within a video frame sequence according to one or more embodiments.

FIG. 2 is a high-level flow diagram illustrating a method 200 for identifying and tracking an object within a video frame sequence according to one or more embodiments. The method 200 represents one embodiment of the function of the video processing software 110 of FIG. 1. The method 200 utilizes frame content, image motion, and various heuristics to provide a holistic, efficient approach to object identification and tracking. The method 200 starts at step 202 and proceeds to step 204 wherein the video frame sequence is accessed from, for example, a memory. In other embodiments, the sequence may be a "live" feed such that the sequence is processed as it is streamed to the computer system. Thus, the term "access" is meant to broadly define any technique used to supply a video frame sequence for processing using the method 200. At step 206, an object is identified and tracked in the video frame sequence. In one embodiment of the invention as described in detail below, step 206 applies an object detection filter to every $n^{th}$ frame and an object tracking filter to every $j^{th}$ frame, where n and j are integers greater than 1 and j<n. At step 208, object descriptors are created for the object identified in the video frame sequence. In one embodiment, the object descriptors are created using object recognition software, in particular, face recognition software available from Cognitec Systems Corporation of Dresden, Germany. Other techniques for describing objects within a video frame sequence may be used. At step 210, the method 200 applies various heuristics to the object and its track to refine the object identity and tracking. At step 212, a document object model (DOM) file is generated, for example, an XML file that contains object descriptors and track information related to each tracked object. The DOM file may be a relatively small file compared to the size of the file containing the video frame sequence. The DOM file can be transferred to other video processing systems to facilitate object searching and identification. The method 200 ends at step 214.

Figure 3:
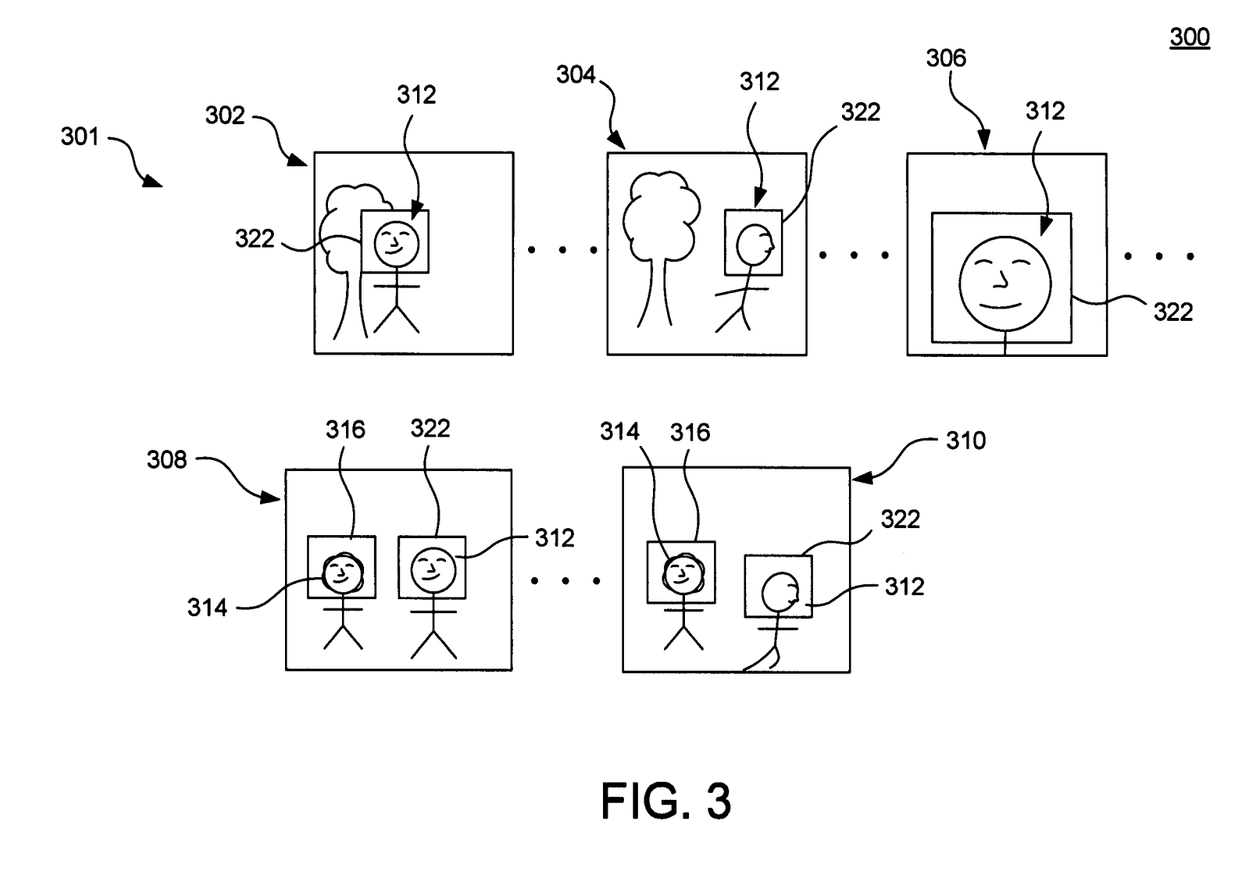
FIG. 3 is a schematic illustrating a frame sequence that is processed according to one or more embodiments.

FIG. 3 illustrates a schematic view 300 depicting a video frame sequence where an object is identified in every $n^{th}$ frame and the object is tracked using every $j^{th}$ frame according to one or more embodiments. The schematic view 300 comprises a first frame 302, a second frame 304, a third frame 306, a fourth frame 308 and a fifth frame 310, the frames represent every $j^{th}$ frame in a frame sequence 301. The first frame 302 includes an identified object 312, for example, a face 312 circumscribed by a geometric shape, for example, a rectangle, that defines a region in which the face is located.

The first frame 302 is assumed to be both a $j^{th}$ and an $n^{th}$ frame such that an object 312 is identified and is tracked in this particular frame 302. As described in detail with respect to FIGS. 4 and 5 below, in one embodiment, a geometric shape, e.g., a rectangle 322, is generated and positioned to circumscribe the identified object, e.g., a face 312. In the second frame 304 (J frames from frame 302), the face 312 is tracked using a motion detection technique to define object motion between frame 302 and frame 304. The object itself is not detected or identified, only the motion of the object (treated as a group of pixels defining features) is determined. Object motion detection is used to track the object 312 through subsequent frames 306, 308 and 310. The details of the technique used for object tracking are described below with respect to FIGS. 4 and 5.

Frame 308 is the $n^{th}$ frame from frame 302. As such, frame 308 is processed using the object identification process such that object 312 is confirmed to still be in the sequence and object 314 is newly detected. A geometric shape 316 is positioned to circumscribe the newly detected object of interest (object 314). Frame 310 is then processed to track the movement of both objects of interest (objects 312 and 314) as the objects are captured in subsequent frames.

In one embodiment, the spatial path through all the frames 302 to 310 can be depicted as a rectangle circumscribing the object and moving from frame to frame. The DOM file for the video frame sequence 302-310 comprises (1) information defining motion of the rectangle(s) from $j^{th}$ video frame to $j^{th}$ video frame and (2) an object descriptor that uniquely defines attributes of the object(s) being tracked. In one embodiment, motion is determined between a prior $j^{th}$ frame to a current $j^{th}$ frame and the object is determined in each $n^{th}$ frame; for example, j may be 3 and n may be 15. Thus, a prior $j^{th}$ frame may be frame 15, the current $j^{th}$ frame may be frame 18 and an $n^{th}$ frame may be frame 15. Motion would subsequently be determined at frames 21, 24, 27 and so on and objects would subsequently be detected at frames 30, 45, 60 and so on.

Figure 4:
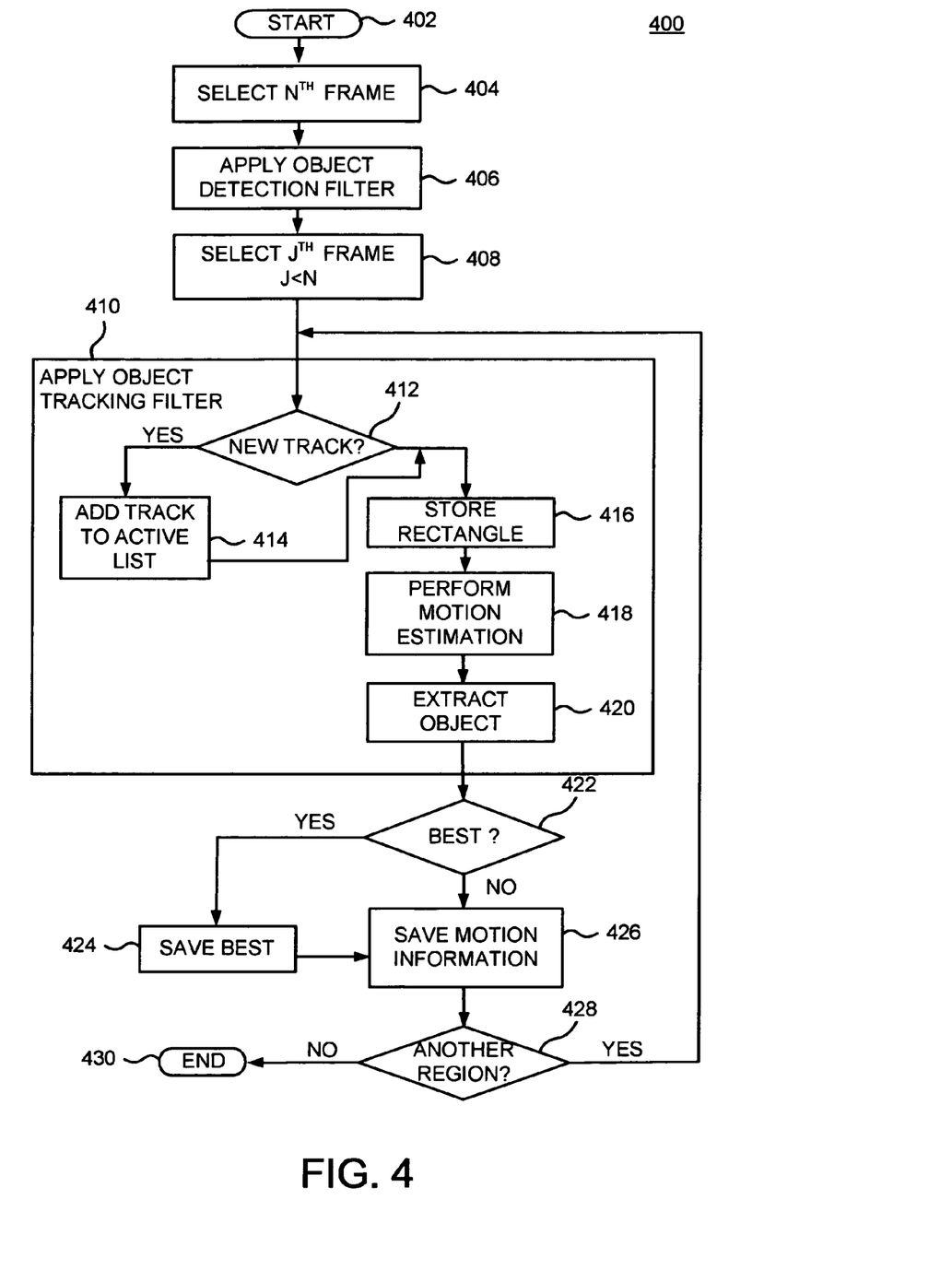
FIG. 4 is a flow diagram illustrating a method for identifying and tracking an object of interest within a video frame sequence according to one or more embodiments.

FIG. 4 is a flow diagram illustrating a method 400 for identifying and tracking an object of interest within a video frame sequence according to one or more embodiments. The method 400 is one embodiment representing an implementation of the functions performed by the object tracking module 112.

The method starts at step 402 and proceeds to step 404 wherein an $n^{th}$ frame is selected from a video frame sequence. At step 406, an object detection filter is applied to the $n^{th}$ frame, where the object detection filter identifies an object of interest, if any, and defines a rectangle circumscribing the object of interest. Further, to improve processing speed, the object detection filter may be applied to a sub-sampled image from the video frame sequence. For example, the original image may be 720×480 pixels and the subsampled image may be 360×240 pixels. Using a sub-sampled image reduces the processing necessary to identify the object. A filter can be selected to identify a specific class of objects, for example, faces or a particular face. Object identification filters are well-known in the art. The particular filter selected depends upon the object of interest that is to be detected. The method 400 may be configured to enable a user to specify one or more object detection filters. In some embodiments, the user may select an appropriate object detection filter from a menu or list.

At step 408, the $j^{th}$ frame is selected, where j<n. At step 410, an object tracking filter is applied to every $j^{th}$ frame. The object tracking filter uses motion estimation techniques to track objects from $j^{th}$ frame to $j^{th}$ frame without performing object detection during the tracking process. Further, the object tracking filter may position a geometric shape circumscribing objects identified by the object detection filter appearing in each of the $j^{th}$ frames.

At step 412, the method queries whether a new object track is to be created for the video frame sequence, e.g., a new track is created whenever an object is detected that doesn't belong to an existing track. To perform the query, a spatial heuristic is applied that compares the bounding rectangle of the detected object to the rectangles associated with any track associated with the most recent $j^{th}$ frame. If a new track is apparent (option "YES"), then the method proceeds to the step 414 where the track is entered into the active tracking list.

Further, If a new track is not identified (option "NO"), then the method proceeds to the step 416. At step 416, the rectangle and the pixels circumscribed thereby for each object track is stored. At step 418, motion estimation is performed for the frame as described below with respect to FIG. 5. At step 420, an object is extracted from the video frame sequence. At step 422, the method queries whether the extracted object is a "best" object or not. The extracted object is tested for clarity and comprehensiveness to represent the track. If the object in this frame is better than others previously saved, the object is saved. If the extracted object is a best object (option "YES"), then the method proceeds to the step 424. If the extracted object is not a best object (option "NO"), then the method proceeds to the step 426. At step 424, the best object is saved in a memory location. At step 426, information pertaining to motion between the frames is saved in a memory location. More specifically, for each object identified by a rectangle, at least one displacement vector is saved. The at least one displacement vector, from frame-to-frame, defines an object's track. At step 428, the method 400 queries whether another object region requires processing. If the query is affirmatively answered, the method 400 proceeds to step 410 to process another region. Otherwise, method 400 ends at step 430.

Further, in accordance with one embodiment of method 400, when motion of the object is predicted, the objects related to the motion are extracted from a predetermined video frame. A subjective quality test can then be applied to the object for deciding whether the object is one of best n-objects so far detected in the video frame sequence. According to one embodiment, the method 400 identifies and saves ten highest quality images of a given object. The motion information is saved and the method 400 terminates. In this manner, a specific object has been saved as well as the motion information related to the object. According to some embodiments, a document object model can be created to include this information.

Figure 5:
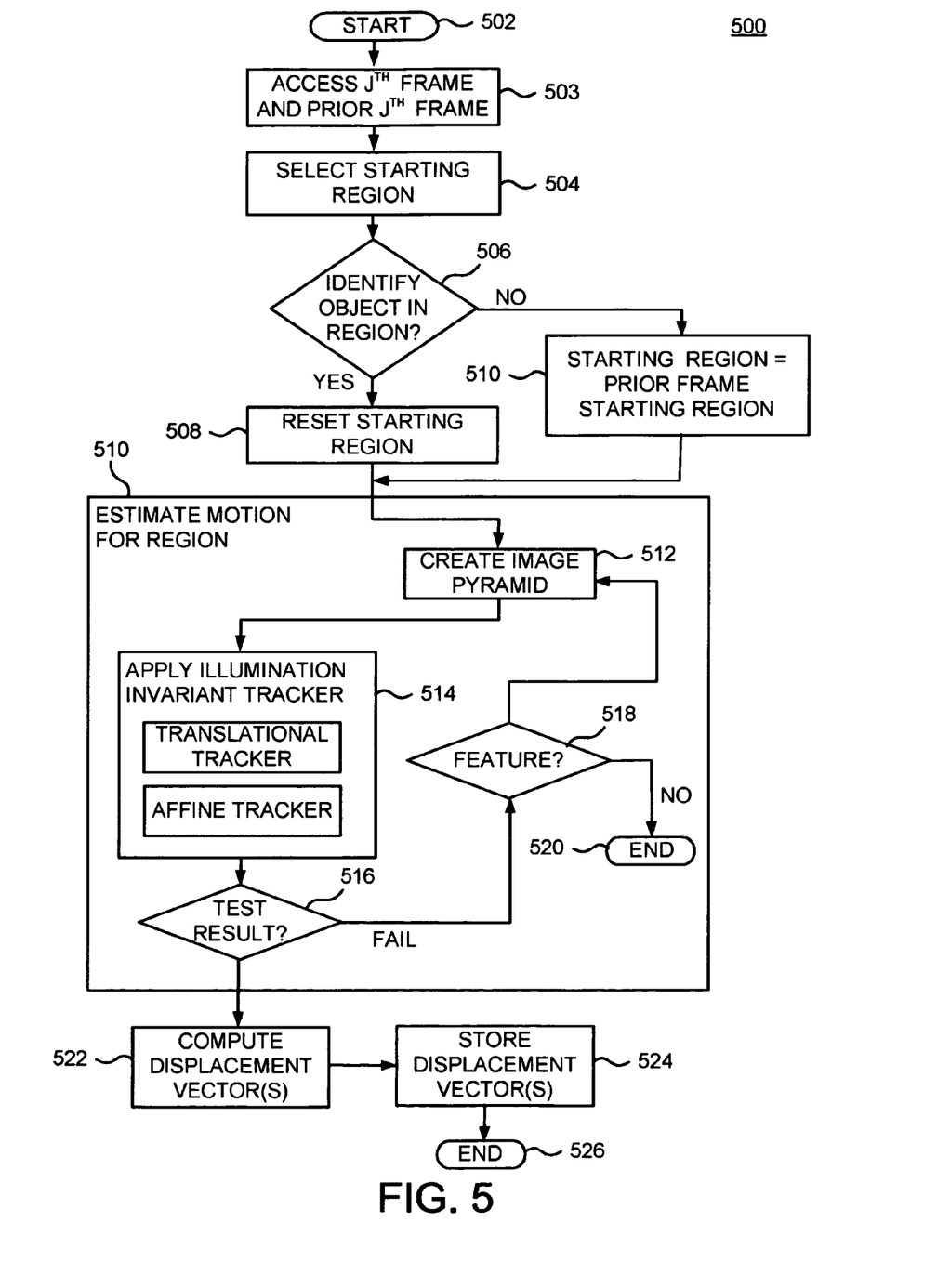
FIG. 5 is a flow diagram illustrating a method for estimating a motion of an object according to one or more embodiments.

FIG. 5 is a flow diagram illustrating a method 500 for estimating motion of an object according to one or more embodiments. The method 500 starts at step 502 and proceeds to step 503 wherein a jth frame and a prior $j^{th}$ frame are accessed for determining motion of objects between the $j^{th}$ frame and the prior $j^{th}$ frame. At step 504, a starting region is selected, where the starting region is typically a similar region that has been processed in a prior $j^{th}$ frame. The region is typically the location of the object rectangle from the prior frame projected to the current frame. At step 506, a decision is made whether an identified object is in the starting region or not. If the $j^{th}$ frame is an $n^{th}$ frame, the object in the region has been identified as an object of interest. Since the object is being tracked using every $j^{th}$ frame, for example, the object can be occluded, left out of the frame, can be rotated, or the object can be unidentifiable for some reason. If the identified object is in the starting region (option "YES"), then the method proceeds to step 508. If the identified object is not in the starting region (option "NO"), then the method proceeds to step 510. At step 508, since the object in the region is identified, the starting region is reset to be the region circumscribing the identified object as produced during object detection in FIG. 4. Further, at step 510, if the object has been altered in such a way that is not recognizable in the current frame, a prior frame starting region is defined as the starting region. The method 500 continues tracking features within the region using motion estimation that may represent the object until the object is recognizable again.

The motion estimation may be performed by any one of a number of available object tracking techniques. In one particular embodiment, the tracking algorithm is a variant of the well-known Lucas-Kanade object tracking technique. This variant is known as an illumination-invariant tracker (I-I Tracker) as disclosed in Jin, et al., "Real-Time Feature Tracking and Outlier Rejection with Changes in Illumination", Proc. of the Intl Conf. on Computer Vision, July 2001.

At step 512, the region is resampled to create an image pyramid representation of the region comprising a plurality of subsampled pyramid levels. At step 514, the I-I Tracker is applied to a base level of the pyramid. The I-I Tracker uses a two-step process; a translational tracker followed by an affine tracker. The translational tracker is applied to the region to determine features and track them to the region in the prior $j^{th}$ frame. Starting at the base level of the pyramid, the translational tracker (a translational motion model) is applied. If the tracking fails at the base level (lowest resolution level) as tested in step 516 (i.e., no features can be tracked), the next level of the pyramid is selected and the translational tracker is applied again. An iterative process is used to improve the motion estimation from the translational tracker. If, during the iterative process, no features are found in the pyramid, the method 500 proceeds from step 518 to end at step 520. If features are found, then the iterative process continues at step 512 to select another level.

The features tracked by the translational tracker are then applied to an affine tracker. The affine tracker generates motion estimation between the $j^{th}$ frame and the prior $j^{th}$ frame (or if the prior $j^{th}$ frame is coincident with an $n^{th}$ frame, then the tracking is reset if the object detector detects a valid object) where the object was last detected. The positions of the features are updated to reflect the refinement provided by the affine tracker. Outlier features are rejected by computing a cross correlation between detected features in the $j^{th}$ frame and the previous $j^{th}$ frame. If the cross correlation is less than a predefined threshold the feature is discarded. The remaining features are positioned using the motion information generated by the affine tracker.

At step 522, the estimated feature locations are compared to the feature locations in the prior $j^{th}$ frame to compute a displacement vector for each feature in the region. At step 524, the displacement vector(s) are stored in memory. The method 500 ends at step 526.

Figure 6:
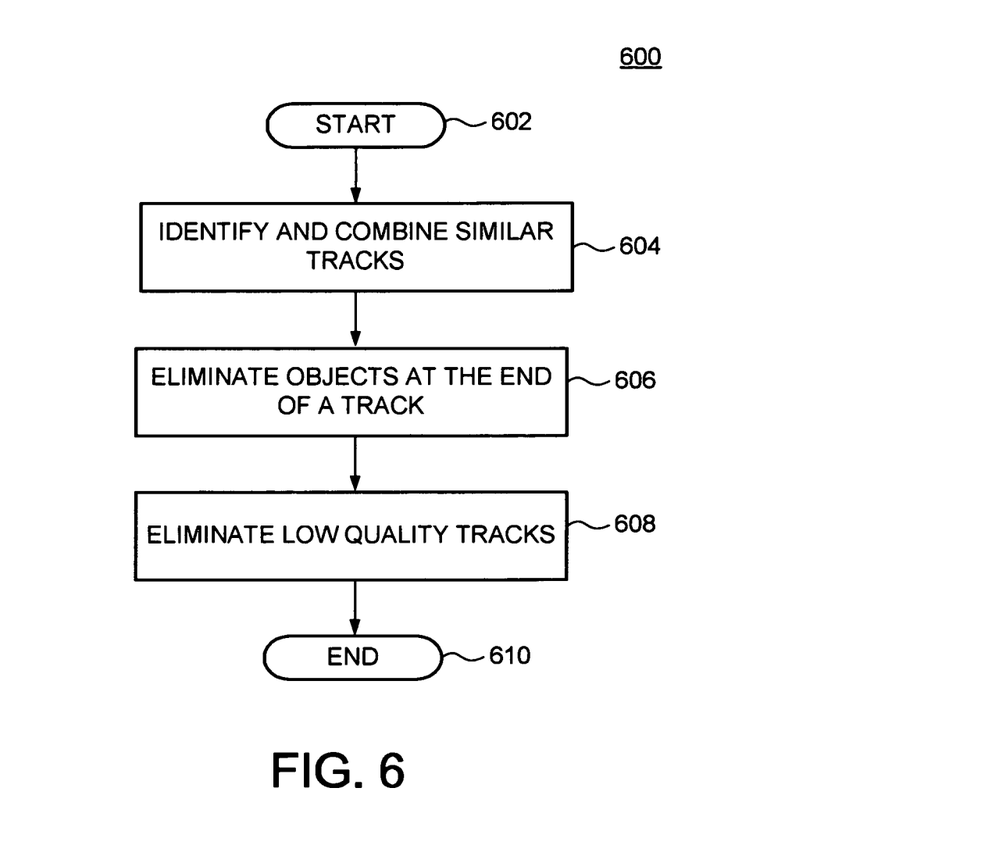
FIG. 6 is schematic diagram of a video processing system according to one or more embodiments.

FIG. 6 depicts a flow diagram of a method 600 for applying certain heuristics to the detected objects and their tracks to refine the object identity and tracking. In one embodiment, the method 600 represents one implementation of the function of the refinement module 118 using the heuristic definitions 114 of FIG. 1. The method 600 begins at step 602 and proceeds to steps 604, 606 and 608 to apply heuristics to identify and combine similar tracks (step 604), eliminate objects at the end of tracks (step 606) and eliminate low quality tracks (step 608), before ending the method at step 610.

Step 604 combines proximate video tracks of similar looking objects. Temporally proximate tracks representing the same object are combined when possible to form a single track. Step 604 compares the "best" object record of each track to determine whether the objects of two temporally proximate tracks are similar. A threshold for the temporal separation between the end of one track and the start of another can be used for identifying temporally proximate tracks and, if the tracks are deemed temporally proximate and include similar objects, the tracks are combined. A Boolean configuration parameter controls a decision whether to invoke this heuristic.

In addition, at step 604, the method 600 combines spatially and temporally overlapping tracks of similar looking objects. Such tracks are deemed to represent the same object. The method 600 compares the temporal separation of tracks and the magnitude of any overlap between the rectangles surrounding the object of each track. Using a threshold for both temporal and spatial similarity, the method 600 determines whether the tracks are similar. The similar tracks are then combined to form a single track. A Boolean configuration parameter may control whether to invoke this heuristic.

At step 606 the method 600 eliminates objects appearing at end of the video clip by truncating tracks temporally at the frame containing the last detected object. Since object detection occurs every $n^{th}$ frame and object tracking occurs every $j^{th}$ frame, if the last $n^{th}$ frame occurs far from the end of the video sequence, there could be tracking "drift" do to the $n^{th}$ frame not being proximate the end of the sequence. This situation may be compounded by an object that is being tracked, but not recognized in the $n^{th}$ frame before the end of the sequence. Thus, the last frame to recognize the object is a prior $n^{th}$ frame, potentially resulting in even greater tracking drift. To avoid such tracking drift, tracks are ended within a video sequence at the last $n^{th}$ frame that detected the object in the track. A configuration threshold may be used to only end tracks at an $n^{th}$ frame if the time from last $n^{th}$ frame to the end of the video clip exceeds the threshold.

At step 608 the method 600 eliminates tracks falling below a track quality threshold. The threshold comprises three criteria. According to a first criterion, a minimum object detection quality whereby one or more detected objects must be of a detection quality that exceeds a configuration threshold. According to a second criterion, a minimum number of objects must exceed a configuration threshold. According to a third criterion, a minimum comparison quality is used to ensure the one or more detected objects have a quality, as defined in the object identification record, exceeding a threshold.

Once the objects and tracks are refined, the object descriptors and their related track information are organized into a DOM file. In one embodiment, creation of the DOM file is performed by execution of the object descriptor generation module 116 of FIG. 1. The track information comprises a frame number sequence and motion vectors representing the movement of the rectangle circumscribing each object. Upon playback using the DOM file, the frame sequence contains rectangles that "follow" the movement of each object through the sequence. The DOM file can then be used to index the sequence. For example, if one "best" object is annotated as being an image of Uncle Joe and another "best" object is an image of Aunt Suzie, an index of DOM files representing many clips could be searched to find, for example, each portion of a clip where Uncle Joe and Aunt Suzie appear together. Certain DOM files would show frame numbers having both Uncle Joe and Aunt Suzie tracks. These frames can be identified and displayed. Once DOM files are created to represent clips, there are many applications for using such concise representations of a video clip. In one embodiment of the invention, the method and apparatus described above are used to process a video frame sequence (video clip) to identify and track faces of people as they appear and move through the clip. The DOM file that is created comprises a description of the video clip, a description of each face detected in the video clip, and a "facetrack" element representing the track of each face after the heuristics are applied to combine, truncate and remove unnecessary tracks. The description of each face references a face identification record (FIR) that provides specific details regarding the face. In one embodiment, the FIR is created using face recognition software available form Cognitec Systems Corporation of Dresden, Germany. Other techniques for describing faces within a video frame sequence may be used. The FIR is also contained in the DOM file.

In one embodiment, the description of the video clip within the DOM file has the following form:

<pict>
  <width>360</width>
  <height>240</height>
  <time>0.000000000000</time>
  <uid>47245BA4-1BEC-4c41-8757-8BC13AC55D13</uid>
  <time>32661.000000000000</time>
</pict> where the "width" and "height" parameters describe the size of a frame in pixels, the "time" parameters define the length of the clip in seconds and the "uid" parameter uniquely identifies the video clip.

In this embodiment, the face description within the DOM file has the following form:

<face>
  <x>91</x>
  <y>15</y>
  <width>63</width>
  <height>63</height>

```
<angle>0.087266460061</angle>
<response>0.723388254642</response>
<classifier_id>0</classifier_id>
<faceID>0</faceID>
<frameno>0</frameno>
<tick>0</tick>
<fir>1</fir>
<clothes>1</clothes>
<tickstart>0</tickstart>
<tickend>508540034340</tickend>
</face>
```

The DOM file contains a face description for each face detected within the clip and identifies the frame number in which the face first appears. As such, the DOM file contains a plurality of face descriptions in the form shown above—one face description for each detected face. The position of one corner of the face within the frame is defined by the "x" and "y" parameters, while the rectangle circumscribing the face is defined by the "width", and "height" parameters. The "angle" parameter defines the rotation of the face as detected by the object detector. The "faceID" parameter contains a unique integer for the particular face and "frameno" parameter provides the frame number in which the particular face appears. The "FIR" parameter is an integer that identifies the face identification record that is associated with this particular face.

The "response" parameter is a quality value of the detected face, the "classifier_id" parameter indicates a classification of the face orientation, e.g., frontal, profile, and the like. The "tick", "tickstart" and "tickend" parameters provide timing information representing a time scale, increasing uniformly from frame-to-frame, from the start to the end of the video sequence. The "clothes" parameter is an optional parameter (an integer value) that identifies a record within the DOM file describing the clothes of the person associated with the face. The clothes description is optionally used as an additional factor to ensure the correct face is being tracked. In other embodiments, other factors could be used.

A FIR has the following form:
```
<face>
    <faceID>3</faceID>
    <blob>AAAAEAAAAAQAAAAEAAAAFAAAAAQ
        AAAAEAAAABAAAAAQAAAAEAAAABAAA
        AAQAAAAEAAAABAAAAAQAAAAEAAAAB
        AAABXwAAAACAAAAAUExNCBGSVIgNy44
        OjpSZWZTZXQAAAAADAAAAAUAAAABAA
        AAAAAAAAEAABg1AAAAAQAAAAAAAAA
        BRcGoAAAAAAIAAAFfInoXHROGv08hCc4
        LdmmEmT14RW aEe3nZR2eoVKS1h316yn1X
        ... [TRUNCATED] ...
        S4imyZpYh5i2d5uFhXW5p2dbdKuctrrLmn
        WHWoaqZcrCh6ZH1eZ0V3Jy
        ULid7W
    </blob>
    <first>
    <x>96.411926269531</x>
    <y>202.029037475586</y>
    <response>1.318608164787</response>
    </first>
    <second>
    <x>131.723480224609</x>
    <y>203.304321289063</y>
    <response>2.684082031250</response>
    </second>
    <quality>0.980531871319</quality>
</face>
```
where the "x" and "y" parameters describe the position of the image being analyzed. The FaceID for the face associated with the FIR is included to identify which face is related to this particular FIR. The "blob" parameter is a description of the detected face—a proprietary representation of a face. The "first" and "second" parameters define the position of the right and left eyes of the detected face and the quality "response" of the detection for each eye. The FIR also contains an overall quality measure "quality" for the overall detected face as produced by the face detector.

A facetrack element has the following form:
```
<facetrack>
    <faceID>0</faceID>
    <face>
    <x>91</x>
    <y>15</y>
    <width>63</width>
    <height>63</height>
    <angle>0.087266460061</angle>
    <response>0.723388254642</response>
    <classifier_id>0</classifier_id>
    <frameno>0</frameno>
    <tick>0</tick>
    </face>
</facetrack>
```

The facetrack element comprises the FaceID that identifies the face that is represented in this track followed by the position of a corner of the face (x,y) and the size of the rectangle (width, height), the quality of the detection (response), and the frame number (frameno) for the detected face. The classifier_id and tick are used in housekeeping functions for the face recognition software. The DOM file contains a sequence of these facetrack elements that together define tracks comprising a sequence of frames and the position of each face in the frame. When displayed, a smoothing method interpolates a track through frames between the $j^{th}$ frames. Consequently, when viewed, the rectangles surrounding the faces smoothly move from frame to frame and accurately track the faces within the video clip.

Example Computer System

Various embodiments of a system and method for identifying and tracking objects within a video frame sequence, as described herein, may be executed on one or more computer systems, which may interact with various other devices. One such computer system is a computer system 700 illustrated by FIG. 7, which may in various embodiments implement any of the elements of functionality illustrated in FIGS. 1-6. In various embodiments, computer system 700 may be configured to implement identifying and tracking objects within a video frame sequence, described above. While the illustrated system demonstrates the computer system 700 implementing identifying and tracking objects within a video frame sequence, the computer system 700 may be used to implement any other system, device, element, functionality or method of the above-described embodiments. In the illustrated embodiments, the computer system 700 may be configured to implement identifying and tracking object in a video frame sequence, as processor-executable program instructions 722 (e.g., program instructions executable by processor(s) 710*a*-710*n*) in various embodiments.

Figure 7:
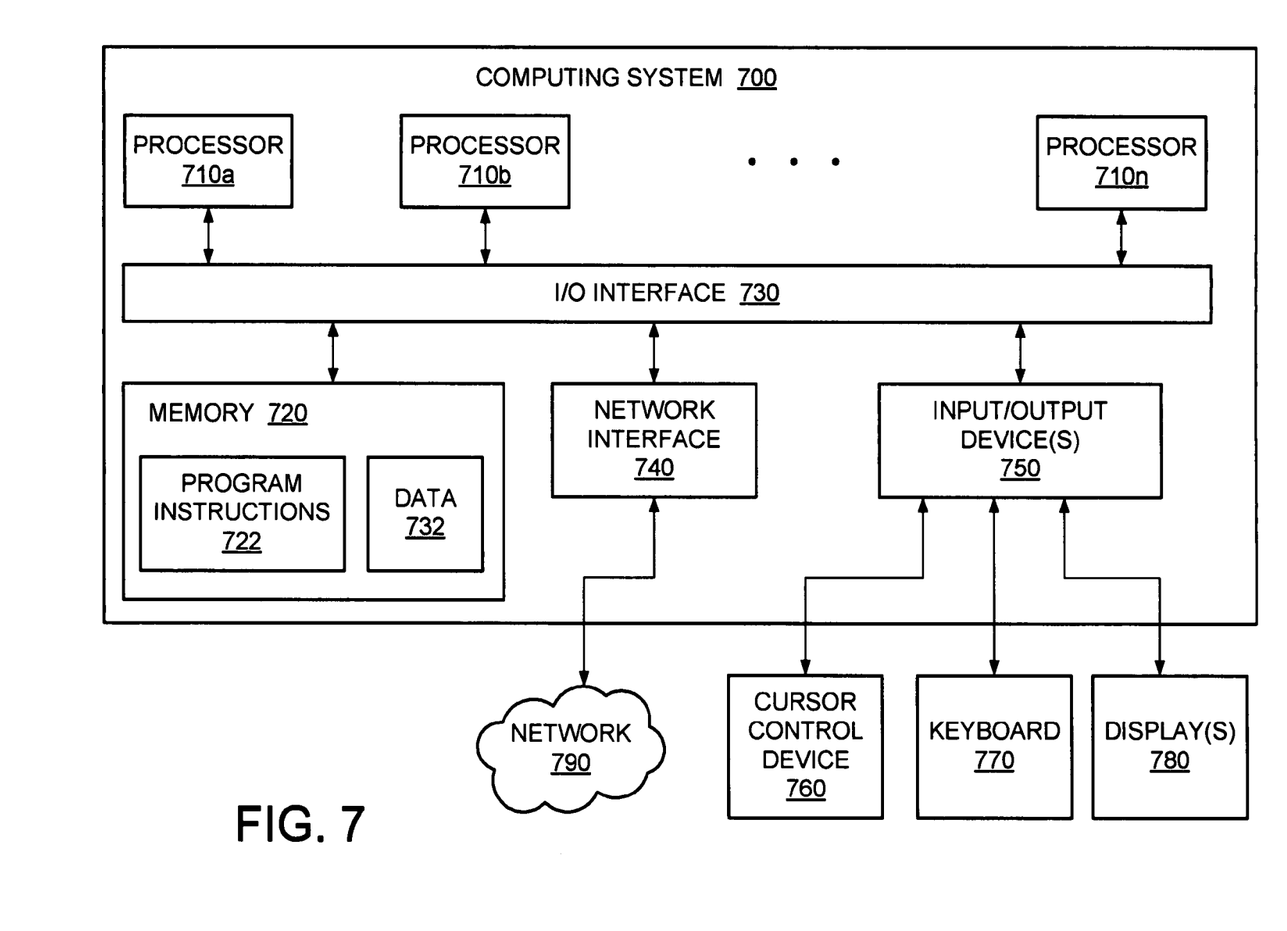
FIG. 7 is a detailed block diagram of a computer system, according to one or more embodiments.

In the illustrated embodiment, the computer system 700 includes one or more processors 710*a*-710*n* coupled to a system memory 720 via an input/output (I/O) interface 730. The computer system 700 further includes a network interface 740 coupled to I/O interface 730, and one or more input/output devices 750, such as cursor control device 760, keyboard 770, and display(s) 780. In various embodiments, any of the components 760-780 may be utilized by application software such as for example, the video frame sequence 120 of FIG. 1, for receiving input. In various embodiments, a user interface may be generated and displayed on the display 780.

In some cases, it is contemplated that embodiments may be implemented using a single instance of the computer system 700, while in other embodiments multiple such systems, or multiple nodes making up the computer system 700, may be configured to host different portions or instances of various embodiments. For example, in one embodiment some elements may be implemented via one or more nodes of the computer system 700 that are distinct from those nodes implementing other elements. In another example, multiple nodes may implement the computer system 700 in a distributed manner.

In different embodiments, the computer system 700 may be any of various types of devices, including, but not limited to, a personal computer system, desktop computer, laptop, notebook, or notebook computer, mainframe computer system, handheld computer, workstation, network computer, a camera, a set top box, a mobile device, a consumer device, application server, or in general any type of computing or electronic device that is used to process video.

In various embodiments, the computer system 700 may be a uniprocessor system including one processor 710a, or a multiprocessor system including several processors 710a-710n (e.g., two, four, eight, or another suitable number). The processors 710a-710n may be any suitable processor capable of executing instructions. For example, in various embodiments the processors 710a-710n may be general-purpose or embedded processors implementing any of a variety of instruction set architectures (ISAs), such as the x96, PowerPC, SPARC, or MIPS ISAs, or any other suitable ISA. In multiprocessor systems, each of the processors 710a-710n may commonly, but not necessarily, implement the same ISA.

System memory 720 may be configured to store program instructions 722 and/or data 732 accessible by the processors 710a-710n. In various embodiments, the system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within the system memory 720. In other embodiments, program instructions and/or data may be received, sent or stored upon different types of computer-accessible media or on similar media separate from the system memory 720 or the computer system 700.

In one embodiment, the I/O interface 730 may be configured to coordinate I/O traffic between the processors 710a-710n, system memory 720, and any peripheral devices in the device, including the network interface 740 or other peripheral interfaces, such as the input/output devices 750, In some embodiments, the I/O interface 730 may perform any necessary protocol, timing or other data transformations to convert data signals from one components (e.g., system memory 720) into a format suitable for use by another component (e.g., processors 710a-710n). In some embodiments, the I/O interface 730 may include support for devices attached through various types of peripheral buses, such as a variant of the Peripheral Component Interconnect (PCI) bus standard or the Universal Serial Bus (USB) standard, for example. In some embodiments, the function of the I/O interface 730 may be split into two or more separate components, such as a north bridge and a south bridge, for example. Also, in some embodiments some or all of the functionality of the I/O interface 730, such as an interface to the system memory 720, may be incorporated directly into the processors 710a-710n.

The network interface 740 may be configured to allow data to be exchanged between the computer system 700 and other devices attached to a network (e.g., network 790), such as one or more external systems or between nodes of the computer system 700. In various embodiments, the network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The Input/output devices 750 may, in some embodiments, include one or more display terminals, keyboards, keypads, touchpads, scanning devices, voice or optical recognition devices, or any other devices suitable for entering or accessing data by one or more computer systems. Multiple input/output devices may be present in the computer system 700 or may be distributed on various nodes of the computer system 700. In some embodiments, similar input/output devices may be separate from the computer system 700 and may interact with one or more nodes of the computer system 700 through a wired or wireless connection, such as over the network interface 740.

In some embodiments, the illustrated computer system may implement any of the methods described above, such as the methods illustrated by the flowchart of FIGS. 2, 4, 5 and 6. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure.

Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of tracking an object within a video frame sequence comprising:
   processing each $j^{th}$ frame of the video frame sequence to determine motion information defining motion of an object between a prior $j^{th}$ frame and a current $j^{th}$ frame;
   applying an object detection filter to every $n^{th}$ frame, wherein $n>j>1$;
   creating an object descriptor for the object being tracked; and
   generating a document object model file comprising the motion information and the object descriptor.

2. The method of claim 1 wherein the processing comprises applying (i) an iterative translation tracker and (ii) an affine tracker.

3. The method of claim 1 wherein the object descriptor defines unique object characteristics.

4. The method of claim 1 further comprising:
   applying heuristics to the motion information and the object descriptor to improve accuracy of the motion information and object descriptors.

5. The method of claim 4 wherein the heuristics are used to provide at least one of combining motion information of closely related tracks of the object, or connecting motion information of contiguous tracks of the object.

6. The method of claim 1 wherein the object is a face.

7. The method of claim 6 wherein the document object file is an XML file comprising a face descriptor for each face appearing in the video frame sequence and a plurality of facetrack elements defining a position of each face in the $j^{th}$ frames in which each face having a face descriptor appears in the video frame sequence.

8. The method of claim 7 further comprising interpolating the position of each face in the $j^{th}$ frames to generate a rectangle circumscribing each face in frames between the $j^{th}$ frames.

9. A computer readable storage medium for storing software that, when executed by a computing system, causes a computing system to perform:
   processing each $j^{th}$ frame of a video frame sequence to determine motion information defining motion of an object between a prior $j^{th}$ frame and a current $j^{th}$ frame;
   applying an object detection filter to every $n^{th}$ frame, wherein $n>j>1$;
   creating an object descriptor for the object being tracked; and
   generating a document object model file comprising the motion information and the object descriptor.

10. The computer readable medium of claim 9 wherein the processing comprises applying (i) an iterative translation tracker and (ii) an affine tracker.

11. The computer readable medium of claim 9 wherein the object descriptor defines unique object characteristics.

12. The computer readable medium of claim 9 further comprising:
   applying heuristics to the motion information and the object descriptor to improve accuracy of the motion information and object descriptors.

13. The computer readable medium of claim 12 wherein the heuristics are used to provide at least one of combining motion information of closely related tracks of the object, or connecting motion information of contiguous tracks of the object.

14. The computer readable medium of claim 9 wherein the document object file is an XML file comprising an object descriptor for each object appearing in the video frame sequence and a plurality of tracking elements defining a position of each object in the $j^{th}$ frames in which each object having an object descriptor appears in the video frame sequence.

15. Apparatus for processing a video frame sequence comprising:
   an object tracking module for processing, on a processor, each $j^{th}$ frame of the video frame sequence to determine motion information defining motion of an object between a prior $j^{th}$ frame and a current $j^{th}$ frame;
   an object detection filter for applying to every $n^{th}$ frame, wherein $n>j>1$; and
   an object descriptor generation module for creating, on a processor, an object descriptor for the object being tracked and for generating a document object model file comprising the motion information and the object descriptor.

16. The apparatus of claim 15, wherein the processing comprises applying (i) an iterative translation tracker and (ii) an affine tracker.

17. The apparatus of claim 15 wherein the object descriptor defines unique object characteristics.

18. The apparatus of claim 15 further comprises:
   a refinement module for applying heuristics to the motion information and the object descriptor to improve accuracy of the motion information and object descriptors.

19. The apparatus of claim 18 wherein the heuristics are used to provide at least one of combining motion information of closely related tracks of the object, or connecting motion information of contiguous tracks of the object.

20. The apparatus of claim 15 wherein the document object file is an XML file comprising an object descriptor for each object appearing in the video frame sequence and a plurality of tracking elements defining a position of each object in the $j^{th}$ frames in which each object having an object descriptor appears in the video frame sequence.

* * * * *